United States Patent [19]

Schwarte et al.

[11] Patent Number: 5,266,361
[45] Date of Patent: Nov. 30, 1993

[54] PREPARATION OF A MULTILAYER COATING

[75] Inventors: Stephan Schwarte, Emsdetten; Ulrich Poth, Münster, both of Fed. Rep. of Germany

[73] Assignee: BASF Lacke + Farben Aktiengesellschaft DE/DE, Munster, Fed. Rep. of Germany

[21] Appl. No.: 674,370

[22] PCT Filed: Sep. 26, 1989

[86] PCT No.: PCT/EP89/01126

§ 371 Date: May 3, 1991

§ 102(e) Date: May 3, 1991

[87] PCT Pub. No.: WO90/03851

PCT Pub. Date: Apr. 19, 1990

[30] Foreign Application Priority Data

Oct. 12, 1988 [DE] Fed. Rep. of Germany ....... 3834738

[51] Int. Cl.$^5$ .............................................. B05D 1/36
[52] U.S. Cl. .................. 427/407.1; 427/409; 524/512
[58] Field of Search ............... 427/385.5, 393.5, 407.1, 427/388.1, 388.3, 409; 524/512

[56] References Cited

U.S. PATENT DOCUMENTS

| | | | |
|---|---|---|---|
| 4,276,210 | 6/1981 | Hohlein et al. | 524/512 |
| 4,378,446 | 3/1983 | Adam et al. | 524/512 |
| 4,450,251 | 5/1984 | Zychowski et al. | 524/512 X |
| 4,490,417 | 12/1984 | Shindow et al. | 524/512 X |
| 4,546,046 | 10/1985 | Etzell et al. | 524/512 X |
| 4,590,235 | 5/1986 | Troy | 524/512 X |
| 4,591,533 | 5/1986 | Antonelli et al. | 524/512 X |
| 4,594,374 | 6/1986 | Stahl et al. | 524/512 X |
| 4,598,111 | 7/1986 | Wright et al. | 524/512 X |
| 4,731,409 | 3/1988 | Miwa et al. | 524/512 X |
| 4,808,656 | 2/1989 | Kania et al. | 524/512 |
| 4,900,774 | 2/1990 | Mitsuji et al. | 524/512 |
| 4,980,410 | 12/1990 | Fryd et al. | 524/512 |
| 5,077,348 | 12/1991 | Nakamura et al. | 524/512 |
| 5,093,408 | 3/1992 | Jung et al. | 524/512 |

Primary Examiner—Joseph L. Schofer
Assistant Examiner—R. H. Delmendo
Attorney, Agent, or Firm—Frank G. Werner; Paul L. Marshall

[57] ABSTRACT

The invention relates to a process for the preparation of a multicoat coating which uses an aqueous, clear topcoat composition containing a polyacrylate resin as binder. The polyacrylate resin can be obtained by adding an ethylenically unsaturated monomer (a1) which contains carboxyl groups, and a mixture (b) consisting of (meth)acrylic esters which are free from carboxyl groups and of ethylenically unsaturated monomers which contain hydroxyl groups, to an organic solvent or mixture of solvents either successively or alternately in part amounts and polymerizing the mixture in the presence of a radical-forming initiator, neutralizing the resultant polyacrylate resin after termination of the polymerization and dispersing it in water. The type and amount of (a1) and (b) are chosen such that the polyacrylate resin has a hydroxyl value of 40 to 200, an acid value of 20 to 100 and a glass transition temperature ($T_G$) of $-40°$ C. to $60°$ C.

5 Claims, 1 Drawing Sheet

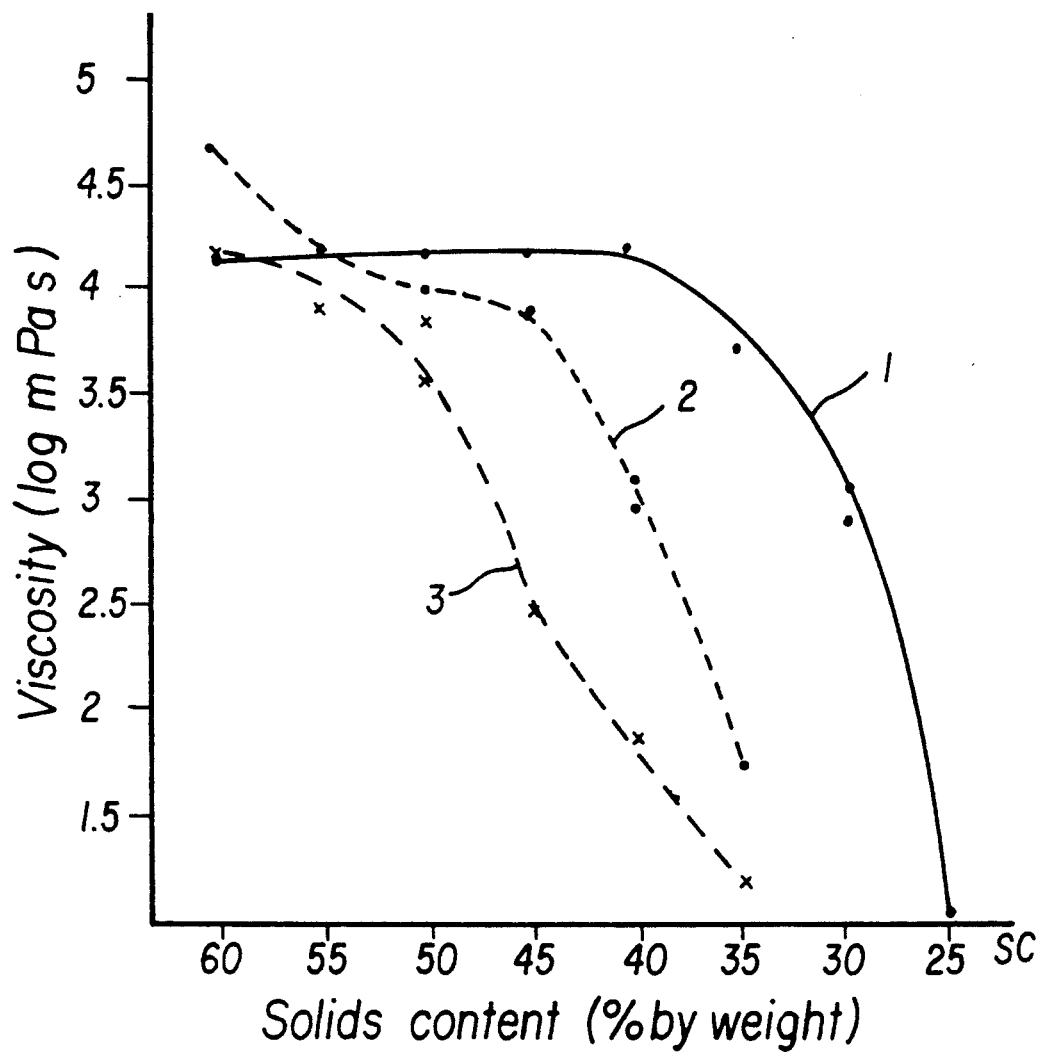

PREPARATION OF A MULTILAYER COATING

FIELD OF THE INVENTION

The invention relates to a process for the preparation of a multicoat protective and/or decorative coating on a substrate surface, in which process (1) a suitable pigmented basecoat composition is applied to the substrate surface, (2) the composition applied in stage (1) forms a polymeric film, (3) a clear aqueous topcoat composition comprising a water-thinnable polyacrylate resin as binder and an aminoplast resin as crosslinking agent is applied to the basecoat obtained in this manner, and subsequently (4) the basecoat and the topcoat are baked together.

The invention also relates to aqueous coating compositions, water-thinnable polyacrylate resins and a process for the preparation of water-thinnable polyacrylate resins.

BACKGROUND ART

The process in accordance with the preamble of patent claim 1 is known. It is used especially for the production of automotive metallic finishes (cf. for example U.S. Pat. No. 3,639,147, DE-A-3,333,072 and EP-A-38,127).

On economic and ecological grounds it is desirable to employ aqueous topcoat compositions in stage (3) of the basecoat-clearcoat process described above.

The topcoat compositions must be sprayable with the aid of automatic painting equipment. For this purpose their solids content must be high enough at spraying viscosity to furnish paint films of adequate film thickness with one to two cross-passes of the spray-gun and they must furnish baked paint films of good appearance (good flow-out, high gloss, good topcoat condition . . . ).

The aqueous topcoat composition disclosed in Example 2 of EP-A-38,127 does not meet all of the above requirements.

The object forming the basis of the present invention consists in the preparation of aqueous topcoat compositions which meet the above requirements.

SUMMARY OF THE INVENTION

Surprisingly, this object is achieved using topcoat compositions which comprise a water-thinnable polyacrylate resin as binder, which resin can be obtained (I) by adding to an organic solvent or mixture of organic solvents, in the presence of at least one polymerization initiator, a mixture of (a1) 2.5–15%, preferably 3–7%, by weight of an ethylenically unsaturated monomer which contains at least one carboxyl group per molecule and is copolymerizable with (b1), (b2) and (b3), or a mixture of such monomers, together with (a2) 0–6% by weight of an ethylenically unsaturated monomer which is free from carboxyl groups and is copolymerizable with (b1), (b2), (b3) and (a1), or a mixture of such monomers, either successively or alternately in part amounts with a mixture (b) consisting of (b1) 40–87.5%, preferably 55–80%, by weight of a (meth)acrylic ester which is copolymerizable with (b2), (b3), (a1) and (a2) and is essentially free from carboxyl groups, or a mixture of such (meth)acrylic esters, and (b2) 10–45%, preferably 12–35%, by weight of an ethylenically unsaturated monomer which is copolymerizable with (b1), (b3), (a1) and (a2), contains at least one hydroxyl group per molecule and is essentially free from carboxyl groups, or a mixture of such monomers, and (b3) 0–25%, preferably 8–18%, by weight of an ethylenically unsaturated monomer, different from (a2), which is copolymerizable with (b1), (b2), (a1) and (a2) and is essentially free from carboxyl groups, or a mixture of such monomers, and (II) by at least partly neutralizing the resultant polyacrylate resin after the termination of the polymerization and dispersing it in water, the total of the weight proportions of (a1), (a2), (b1), (b2), and (b3) being always 100% by weight and the type and amount of (b1), (b2), (b3), (a1) and (a2) being chosen such that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

BRIEF DESCRIPTION OF THE DRAWING

The accompanying FIGURE is a plot of viscosity as a function of solids content for several of the compositions prepared in the Examples herein.

DESCRIPTION OF THE PREFERRED EMBODIMENTS

The pigmented basecoat compositions to be applied in stage (1) of the process according to the invention are well known (cf. for example U.S. Pat. No. 3,639,147, EP-A-38,127, DE-A-3,333,072 and EP-A-279,813). The basecoat compositions used in stage (1) preferably comprise metal pigments, especially aluminum pigments, metallic finishes being obtained in this manner.

Before the preparation of the polyacrylate resins to be used according to the invention is described in detail, two terms will be clarified first:

1) in a number of places "(meth)acrylic acid" is used as an abbreviation for "methacrylic or acrylic acid".

2) The term "essentially free from carboxyl groups" is intended to indicate that the components (b1), (b2) and (b3) may possess a low content of carboxyl groups (not more, however, than would impart to a polyacrylate resin prepared from the components (b1), (b2) and (b3) an acid value greater than 10). It is preferred, however, that the content of carboxyl groups of the components (b1), (b2) and (b3) is kept as low as possible. The use of components (b1), (b2) and (b3) which are free from carboxyl groups is particularly preferred.

Any ethylenically unsaturated monomer which contains at least one carboxyl group per molecule and is copolymerizable with (b1), (b2) and (b3), or a mixture of such monomers, may be employed as component (a1) for the preparation of the polyacrylate resins to be used according to the invention. Acrylic and/or methacrylic acid are preferably used as the component (a1). However, other ethylenically unsaturated acids having up to 6 carbon atoms in the molecule may be used. Examples of such acids are ethacrylic acid, crotonic acid, maleic acid, fumaric acid and itaconic acid. Mono(meth)acryloylhydroxyethyl succinate and mono(meth)a- cryloylhydroxyethyl phthalate, for example, may also be used as the component (a1).

Any ethylenically unsaturated monomer which is copolymerizable with (b1), (b2), (b3) and (a1), or a mixture of such monomers, may be used as the component (a2). All the monomers listed in the description of the components (b1), (b2) and (b3) may be used as the component (a2).

It is preferred to employ 100% by weight of the component (a1). In other words: It is preferred to use the component (a1) without admixture of the component (a2).

Any ester of (meth)acrylic acid which is copolymerizable with (b2), (b3), (a1) and (a2) and is essentially free from carboxyl groups, or a mixture of such (meth)acrylates, may be used as component (b1). Examples of these are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate. Preferably used as the component (b1) are mixtures of alkyl acrylates and/or alkyl methacrylates which comprise at least 25% by weight of n-butyl or t-butyl acrylate and/or n-butyl or t-butyl methacrylate.

Any ethylenically unsaturated monomer which is copolymerizable with (b1), (b3), (a1) and (a2), contains at least one hydroxyl group per molecule and is essentially free from carboxyl groups, or a mixture of such monomers, may be used as the component (b2). Examples are hydroxyalkyl esters of acrylic acid, methacrylic acid or another $\alpha, \beta$-ethylenically unsaturated carboxylic acid. These esters may be derived from an alkylene glycol which is esterified with the acid, or they may be obtained by reacting the acid with an alkylene oxide. Hydroxyalkyl esters of acrylic acid and methacrylic acid in which the hydroxyalkyl group contains up to 4 carbon atoms, reaction products of cyclic esters, for example $\epsilon$-caprolactone and these hydroxyalkyl esters or mixtures of these hydroxyalkyl esters and $\epsilon$-caprolactone-modified hydroxyalkyl esters are preferably employed as the component (b2). Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, for example ethacrylic acid, crotonic acid and similar acids having up to about 6 carbon atoms per molecule, may be also used.

Any ethylenically unsaturated monomer which is copolymerizable with (b1), (b2), (a1) and (a2) and is essentially free from carboxyl groups, or a mixture of such monomers, may be employed as the component (b3). Vinylaromatic hydrocarbons, such as styrene, $\alpha$-alkylstyrene and vinyltoluene, are preferably used as the component (b3).

The polyacrylate resins employed according to the invention may be prepared by adding 60 to 100% by weight of the component (a1) together with 0–40% by weight of the component (a2) to an organic solvent or mixture of solvents and polymerizing the mixture in the presence of at least one polymerization initiator and, after addition of the components (a1) and (a2) has been completed, adding a mixture (b), consisting of the components (b1) and (b2), with or without (b3) to the organic solvent or mixture of solvents and polymerizing the mixture there in the presence of at least one polymerization initiator. After the termination of the polymerization the resultant polyacrylate resin is at least partially neutralized and dispersed in water. The total of the weight proportions of (a1) and (a2) is always 100% by weight. The type and amount of the components (a1), (a2), (b1), (b2) and (b3) are chosen such that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

The component (a1) is added to the organic solvent or mixture of solvents—with or without the component (a2)—preferably within 10 to 60 minutes, particularly preferably within 15 to 45 minutes, and is polymerized in solution in the presence of at least one free-radical initiator. The mixture (b) is added to the organic solvent or mixture of solvents preferably within 2 to 8 hours, particularly preferably within 3 to 6 hours, and is polymerized in solution in the presence of at least one free-radical initiator.

The polyacrylate resins to be used according to the invention may also be prepared by adding the component (a1) (with or without (a2)) and the mixture (b) to an organic solvent or mixture of solvents in part amounts alternately and polymerizing the mixture in solution in the presence of at least one free-radical initiator. The part amounts should in each case consist of at least 10% by weight of the total amount of the components (a1) and (a2) and the mixture (b) to be employed. After the termination of the polymerization the resultant polyacrylate resin is at least partly neutralized and dispersed in water. The total amount of weight proportions of (a1) and (a2) is always 100% by weight. The type and amount of the components (a1), (a2), (b1), (b2) and (b3) are chosen such that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

In a preferred embodiment of this method of preparation, in a first stage an amount of the component (b) (amount 1) consisting of 30 to 70% by weight, preferably 40 to 60% by weight, particularly preferably 50% by weight, of the total amount of the component (b) to be used is added to the organic solvent or mixture of solvents and is polymerized in the presence of at least one free-radical initiator. When the addition of the amount 1 is completed, in a second stage an amount of the component (a1) (amount 2) consisting of 30 to 70% by weight, preferably 40 to 60% by weight, particularly preferably 50% by weight, of the total amount of the component (a1) to be used is added to the organic solvent or mixture of solvents and is polymerized in the presence of at least one free-radical initiator. When the addition of the amount 2 is completed, in a third stage an amount of the component (b) (amount 3) consisting of 30 to 70% by weight, preferably 40 to 60% by weight, particularly preferably 50% by weight, of the total amount of the component (b) to be used, is added to the organic solvent or mixture of solvents and is polymerized in the presence of at least one free radical initiator. When the addition of the amount 3 is completed, in the fourth stage an amount of the component (a1) (amount 4) consisting of 30 to 70% by weight, preferably 40 to 60% by weight, particularly preferably 50% by weight, of the total amount of the component (a1) to be used is added to the organic solvent or mixture of solvents and is polymerized in the presence of at least one free radical initiator.

After the termination of the polymerization the resultant polyacrylate resin is at least partly neutralized and dispersed in water. The total of the weight proportions of (a1) and (a2) is always 100% by weight. The type and amount of components (a1), (a2), (b1), (b2) and (b3) are chosen such that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

The addition of the amounts 1 and 3 is preferably carried out within 1 to 4 hours, particularly preferably within 1.5 to 3 hours. The addition of the amounts 2 and 4 is preferably carried out within 5 to 30 minutes, particularly preferably within 7 to 20 minutes.

The solvents and polymerization initiators which are customary for the preparation of polyacrylate resins and are suitable for the preparation of aqueous dispersions are employed as the organic solvents and polymerization initiators. Examples of suitable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol. Examples of suitable polymerization initiators are free-radical initiators, for example benzoyl peroxide, azobisisobutyronitrile and t-butyl perbenzoate. The polymerization is performed at a temperature of 80° to 160° C., preferably 120° to 160° C. The polymerization is completed when all the monomers used have essentially completely reacted.

The type and amount of the components (a1), (a2), (b1), (b2) and (b3) are chosen such that the reaction product has a hydroxyl value of 40 to 200, preferably 60 to 140, an acid value of 20 to 100, preferably 25 to 50 and a glass transition temperature ($T_G$) of $-40°$ C. to $+60°$ C., preferably $-20°$ C. to $+40°$ C.

The approximate glass transition temperatures of polyacrylate resins may be calculated using the following formula:

$$\frac{1}{T_G} = \sum_{n=1}^{n=x} \frac{W_n}{T_{Gn}};$$

$T_G$ = glass transition temperature of the polyacrylate resin
$x$ = number of the various monomers incorporated in the polyacrylate resin
$W_n$ = weight proportion of the nth monomer
$T_{Gn}$ = glass transition temperature of the homopolymer obtained from the nth monomer The amount and the rate of addition of the initiator is preferably controlled in such a way that the resultant polyacrylate resin has a number-average molecular weight of 2,500 to 20,000. It is particularly preferred to commence the addition of the initiator at the same time as the addition of the polymerizable components (a1), (a2) and (b) and to terminate it about half an hour after completing the addition of the polymerizable components (a1), (a2) and (b). The reaction mixture is subsequently kept at the polymerization temperature for long enough (as a rule about 1.5 hours) for all the used monomers to have essentially completely reacted. The expression "essentially completely reacted" is intended to signify that preferably 100% by weight of the monomers used have reacted, but that there is also the possibility that a small residual content of monomers, not greater than 0.5% by weight based on the weight of the reaction mixture, may remain unreacted.

The polyacrylate resins according to the invention are prepared by using 40 to 87.5% by weight, preferably 55 to 80% by weight, of the component (b1), 10 to 45% by weight, preferably 12 to 35% by weight, of the component (b2), 0 to 25% by weight, preferably 8 to 18% by weight, of the component (b3), 2.5 to 15% by weight, preferably 3 to 7% by weight, of the component (a1) and 0 to 6% by weight of the component (a2), the total of the weight proportions of (b1), (b2), (b3), (a1) and (a2) being always 100% by weight.

After the termination of the polymerization the resultant polyacrylate resin is at least partly neutralized and dispersed in water.

Organic bases as well as inorganic bases, such as ammonia and hydrazine, may be used for the neutralization. Primary, secondary and tertiary amines, for example ethylamine, propylamine, dimethylamine, dibutylamine, cyclohexylamine, benzylamine, morpholine, piperidine and triethanolamine are preferably employed. Tertiary amines, especially dimethylethanolamine, triethylamine, tripropylamine and tributylamine, are particularly preferably used as neutralization agents.

The neutralization reaction is generally performed by mixing the neutralizing base with the polyacrylate resin, in which case enough base is preferably used for the topcoat coating composition to have a pH of 7–8.5, preferably 7.2 to 7.8.

The partly or completely neutralized polyacrylate resin is subsequently dispersed by the addition of water, an aqueous polyacrylate resin dispersion being formed. A part or all of the organic solvent may be distilled off, if desired. The polyacrylate resin dispersions according to the invention contain polyacrylate resin particles whose average particle size is preferably between 60 and 250 nm (method of measurement: laser light scatter; measuring instrument: Malvern Autosizer 2C).

Topcoat compositions according to the invention are produced from the aqueous polyacrylate resin dispersions obtained in this manner by generally known methods by the admixture of an aminoplast resin and, if appropriate, of other additives, for example flow control agents, UV stabilizers, transparent pigments etc.

The topcoat compositions according to the invention preferably contain enough aminoplast resin for the weight ratio of the polyacrylate resin solids to the aminoplast resin solids to be 60:40 to 90:10, particularly preferably 70:30 to 85:15.

In principle any aminoplast resin which can be processed with the polyacrylate resin according to the invention to form a stable topcoat coating composition may be used as crosslinking agent. Melamine-formaldehyde resins which are partly or completely etherified with aliphatic alcohols having preferably 1 to 4 carbon atoms per molecule are preferred as crosslinking agents.

Prior to being applied, the topcoat coating compositions according to the invention are adjusted to spraying viscosity (generally 20 to 40 seconds efflux time from a DIN Cup 4 (DIN 53211 (1974))) and a pH of 7.0 to 8.5, preferably 7.2 to 7.8.

The topcoat compositions according to the invention have at spraying viscosity a solids content (20 to 45% by weight, preferably 32 to 40% by weight) which is high enough to furnish paint films of adequate film thickness with one or two cross-passes of the spray-gun (the thickness of the baked paint film should preferably be between 25 and 45 μm), and furnish baked paint films of very good appearance (good flow-out, high gloss, good topcoat conditions . . . ) and good mechanical application properties, and comprise a relatively low proportion of organic cosolvents (less than 35% by weight based on the total solids contents of binders and crosslinking agents).

If the topcoat compositions according to the invention are employed in conjunction with water-thinnable basecoat compositions for the production of metallic finishes, then metallic finishes are obtained in which the clear topcoat adheres particularly well to the basecoat.

The topcoat compositions according to the invention may comprise in addition to the polyacrylate resin used according to the invention also crosslinked polymer microparticles such as those disclosed, for example, in EP-A-38,127, and/or further compatible resins, for example water-thinnable or water-soluble polyacrylate resins, polyester resins, alkyd resins or epoxy resin esters, and they may also be pigmented.

The invention is explained in greater detail in the Examples below:

A. Preparation of water-thinnable polyacrylate resins according to the invention

TABLE 1

| Component | Monomer | Amounts added in parts by weight | | |
|---|---|---|---|---|
| | | P1 | P2 | P3 |
| (a1) | Acrylic acid | 5.0 | 5.0 | 5.0 |
| (b1) | Butyl acrylate | 22.0 | 22.0 | 22.0 |
| | Butyl methacrylate | 20.0 | 20.0 | 20.0 |
| | Methyl methacrylate | 15.0 | 15.0 | 15.0 |
| (b2) | 2-Hydroxypropyl acrylate | 23.0 | 23.0 | 23.0 |
| (b3) | Styrene | 15.0 | 15.0 | 15.0 |

P1> 20 parts by weight of butyl glycol are introduced into a 4 liter steel reaction vessel provided with two monomer inlets, an initiator inlet, a stirrer, a thermometer, an oil bath and a reflux condenser and are heated to 140° C. A solution of 4.5 parts by weight of butyl perbenzoate in 5 parts by weight of butyl glycol is then added at such a rate that the addition is concluded in 4 hours 30 minutes. At the same time as the addition of the butyl perbenzoate solution commences, the addition of the component (a1) commences as well (cf. Table 1). The component (a1) is added at such a rate that the addition is concluded in 20 minutes. After all of the component (a1) has been added, the mixture of (b1), (b2) and (b3) is added within 3 hours 40 minutes. The reaction mixture is subsequently kept at 140° C. for long enough for the solids content of the resin solution to be at least 80% by weight (1 hour, 130° C.). The resin solution obtained in this manner is neutralized with dimethylethanolamine at 95° C. until a degree of neutralization of 80% is reached. Subsequently enough water is added for the solids content of the dispersion to be about 60% by weight.

P2> 20 parts by weight of butyl glycol are introduced into a 4 liter steel reaction vessel provided with two monomer inlets, an initiator inlet, a stirrer, a thermometer, an oil bath and a reflux condenser and are heated to 140° C. A solution of 4.5 parts by weight of butyl perbenzoate in 5 parts by weight of butyl glycol is then added at such a rate that the addition is concluded in 4 hours 30 minutes.

At the same time as the addition of the butyl perbenzoate solution commences, the addition of 50% by weight of the total amount of the mixture of (b1), (b2) and (b3) to be used commences as well. This amount of the mixture of (b1), (b2) and (b3) is added at such a rate that the addition is concluded after 1 hour 53 minutes. When the addition of the first part of the mixture of (b1), (b2) and (b3) is concluded, 50% by weight of the total amount of the component (a1) to be used is added within 7 minutes. The remaining 50% by weight of the total amount of the mixture of (b1), (b2) and (b3) to be used is added subsequently within 1 hour 52 minutes. After all of the remaining 50% by weight of the total amount of the mixture (b1), (b2) and (b3) to be used has been added, the remaining 50% by weight of the total amount of the component (a1) to be used is added within 8 minutes. The reaction mixture is subsequently kept at 140° C. for long enough for the solids content of the resin solution to be at least 80% by weight (1 hour, 130° C.).

The resin solution obtained in this manner is neutralized with dimethylethanolamine at 95° C. until a degree of neutralization of 80% is reached. Subsequently enough water is added for the solids content of the dispersion to be about 60% by weight.

P3> 20 parts by weight of butyl glycol are introduced into a 4 liter steel reaction vessel provided with two monomer inlets, an initiator inlet, a stirrer, a thermometer, an oil bath and a reflux condenser and are heated to 140° C. A solution of 4.5 parts by weight of butyl perbenzoate in 5 parts by weight of butyl glycol is then added at such a rate that the addition is concluded in 4 hours 30 minutes. At the same time as the addition of the butyl perbenzoate solution commences, the addition of 33.3% by weight of the total amount of the component (a1) to be used (amount 1) commences as well. The amount 1 is added at such a rate that the addition is concluded in 10 minutes. After the addition of the amount 1 has been concluded, 50% by weight of the total amount of the mixture of (b1), (b2) and (b3) to be used (amount 2) is added within 1 hour 55 minutes. After all of the amount 2 has been added, 33.3% by weight of the total amount of the component (a1) to be used (amount 3) is added within 10 minutes. When the addition of the amount 3 is concluded, the remaining 50% by weight of the total amount of the mixture (b1), (b2) and (b3) to be used (amount 4) is added within 1 hour 55 minutes. After all of the amount 4 has been added, the remaining 33.33% by weight of the total amount of the component (a1) to be used (amount 5) is finally added within 10 minutes. The reaction mixture is subsequently kept at 140° C. for long enough for the solids content of the resin solution to be at least 80% by weight (1 hour, 130° C.).

The resin solution obtained in this manner is neutralized with dimethylethanolamine at 95° C. until a degree of neutralization of 80% is reached. Subsequently enough water is added for the solids content of the dispersion to be about 60% by weight.

The resultant dispersions have the following characteristics:

TABLE 2

| | P1 | P2 | P3 |
|---|---|---|---|
| Solids (% by weight; 1 h, 130° C.) | 59.6 | 59.0 | 59.6 |

TABLE 2-continued

|  | P1 | P2 | P3 |
|---|---|---|---|
| Acid value | 29.9 | 38.9 | 33.0 |
| Degree of neutralization (%) | 80 | 80 | 80 |
| OH value | 100 | 100 | 100 |
| Particle size 1) (nm) | 119 | 190 | 67 |

1) The particle size is determined by laser light scatter. Apparatus: Malvern Autosizer 2C.

B. Preparation of clear aqueous topcoat composition according to the invention Clear topcoat compositions are prepared from 60.00% by weight of a polyacrylate dispersion prepared in section A, 29.95% by weight of distilled water, 10.00% by weight of a 90% strength solution of a commercial water-thinnable melamine-formaldehyde resin in isobutanol (Cymel 327) and 0.05% by weight of a commercial flow control agent (Fluorad FC 430); they are adjusted to spraying viscosity (24 seconds efflux time from DIN Cup 4 (DIN 53211 (1974))) and a pH of 7.4 to 7.5 using 10% aqueous dimethylethanolamine solution and distilled water. The topcoat compositions comprise 20% by weight of organic co-solvents based on total solids content of polyacrylate resin and melamine-formaldehyde resin.

C. Application of the clear topcoat compositions according to the invention and testing of the baked paint films A water-thinnable basecoat composition pigmented with aluminum platelets in accordance with EP-A-279,813 is applied to a phosphated steel sheet coated with a commercial electrocoating paint and a commercial filler in such a way that the dry film thickness is 12-15 μm. The applied basecoat composition is dried for 10 minutes at room temperature and for 10 minutes at 80° C.; it is then sprayed with the topcoat composition from section B in two cross-passes of the spray-gun with one minute flash-off period between the passes. The paint is finally dried for 20 minutes at room temperature and baked for 30 minutes at 130° C. in a circulating-air oven. The multicoat coatings obtained in this manner were subjected to a number of tests. The results of these are summarized in the following Table:

TABLE 3

|  | P1 | P2 | P3 |
|---|---|---|---|
| Application solids content (1 h, 130° C., % by weight) | 41.0 | 35.0 | 36.0 |
| Thickness of the clear topcoat (μm) | 31 | 30 | 30 |
| Crosshatch test (1) | 0-1 | 0-1 | 0 |
| Gloss (2) | 86 | 86 | 86 |

(1) Test in accordance with DIN 53151 including the Tesa pull-off test
(2) Degree of gloss in accordance with DIN 67530, angle 20°

B. Comparison example

The monomers (a1), (b1), (b2) and (b3) used for the preparation of the polyacrylate resins P1 and P3 according to the invention are mixed and polymerized. The polymerization conditions are identical with those prevailing in the preparation of the polyacrylate resins P1 and P3 according to the invention. The sole difference from the preparation of the polyacrylate resins according to the invention is that the component (a1) is not added prior to the mixing of (b1), (b2) and (b3) as in the case of P1 and not alternately as in the case of P3, but together with (b1), (b2) and (b3). An aqueous topcoat composition prepared from the polyacrylate resin V thus prepared in accordance with B has a solids content as low as 24.1% by weight at a viscosity of 24 DIN seconds (efflux time from a DIN Cup 4 (DIN 53211 (1974))) and a pH of 7.4 to 7.5.

The diagram shown in the accompanying FIGURE demonstrates the viscosities of the polyacrylate dispersions P1 and P3 prepared in accordance with A and thinned with water as a function of the solids content of the dispersions compared with a similar dispersion of the polyacrylate resin V (pH of the dispersions: 7.8). Curves 1, 2, and 3 represent the values for V, P3, and P1, respectively. It becomes clear that the viscosities of the polyacrylate resin dispersions P1 and P3 according to the invention are, at solids contents of less than about 55% by weight, are lower than the viscosity of the dispersion of the polyacrylate resin V.

We claim:

1. A process for coating a substrate using a pigmented basecoat composition and a clear aqueous topcoat composition, said clear aqueous topcoat composition having a solids content of less than about 55% by weight and comprising a water-thinnable polyacrylate resin as binder and an aminoplast resin as crosslinking agent, said process comprising the steps of:

(1) applying a pigmented basecoat composition to the substrate surface, the applied basecoat composition forming a polymeric film, (2) applying a clear aqueous topcoat composition to the basecoat, and subsequently (3) baking the basecoat and the topcoat together, wherein said water-thinnable polyacrylate resin is obtained (I) by adding to an organic solvent or mixture of organic solvents, in the presence of at least one polymerization initiator, a mixture of (a1) 2.5-15% by weight of an ethylenically unsaturated monomer which contains at least one carboxyl group per molecule and is copolymerizable with (b1), (b2) and (b3), or a mixture of such monomers (a1), together with (a2) 0-6% by weight of an ethylenically unsaturated monomer which is free from carboxyl groups and is copolymerizable with (b1), (b2), (b3) and (a1), or a mixture of such monomers (a2), either successively or alternately in part amounts with a mixture (b) consisting of (b1) 40-87.5% by weight of a (meth)acrylic ester which is copolymerizable with (b2), (b3), (a1) and (a2) and is essentially free from carboxyl groups, or a mixture of such (meth)acrylic esters, and (b2) 10-45% by weight of an ethylenically unsaturated monomer which is copolymerizable with (b1), (b3), (a1) and (a2), contains at least one hydroxyl group per molecule and is essentially free from carboxyl groups, or a mixture of such monomers (b2), and, (b3) 0-25% by weight of an ethylenically unsaturated monomer, different from (a2), which is copolymerizable with (b1), (b2), (a1) and (a2) and is essentially free from carboxyl groups, or a mixture of such monomers (b3), and (II) by at least partly neutralizing the resultant polyacrylate resin after the termination of the polymerization and dispersing it in water, the total of the weight proportions of (a1), (a2), (b1), (b2) and (b3) being always 100% by weight, and the amount of (b1), (b2), (b3), (a1) and (a2) being chosen such that the polyacrylate resin has a hydroxyl value of 40 to 200, an acid value of 20 to 100, and a glass transition temperature ($T_g$) of $-40°$ C. to $+60°$ C.

2. The process as claimed in claim 1, wherein the basecoat composition applied in step 1 is an aqueous basecoat composition.

3. The process as claimed in claim 1, wherein no component (a2) is used.

4. The process as claimed in claim 1, wherein no component (a2) is used and wherein an amount of the component (b) (amount 1) consisting of 30 to 70% by weight of the total amount of the component (b) to be used is added first, after which an amount of the component (a1) (amount 2) consisting of 30 to 70% by weight of the total amount of the component (a1) to be used is added, after which an amount of the component (b) (amount 3) consisting of 30 to 70% by weight of the total amount of the component (b) to be used is added and finally an amount of component (a1) (amount 4) consisting of 30 to 70% by weight of the total amount of the component (a1) to be used is added, the total of the weight proportions of amounts 1 and 3 and the total of the weight proportions of amounts 2 and 4 always being 100% by weight.

5. The process as claimed in claim 1, wherein no component (a2) is used and wherein an amount of the component (b) (amount 1) consisting of 30 to 70% by weight of the total amount of the component (b) to be used is added first, after which an amount of the component (a1) (amount 2) consisting of 30 to 70% by weight of the total amount of the component (a1) to be used is added, after which an amount of the component (b) (amount 3) consisting of 30 to 70% by weight of the total amount of the component (b) to be used is added and finally an amount of component (a1) (amount 4) consisting of 30 to 70% by weight of the total amount of the component (a1) to be used is added, the total of the weight proportions of amounts 1 and 3 and the total of the weight proportions of amounts 2 and 4 always being 100% by weight, and wherein polymerization takes place at a temperature of 80° to 160° C. in the presence of at least one free-radical initiator, and the addition of the amount 1 lasts 1 to 4 hours, the addition of amounts 2 lasts 5 to 30 minutes, the addition of the amount 3 lasts 1 to 4 hours and the addition of the amount 4 lasts 5 to 30 minutes.

* * * * *